United States Patent
Kellar

(10) Patent No.: US 10,491,964 B2
(45) Date of Patent: Nov. 26, 2019

(54) ASSISTED ACCELERATION FOR VIDEO STREAMING CLIENTS

(71) Applicant: Cisco Technology, Inc., San Jose, CA (US)

(72) Inventor: James N. Kellar, Pewsey (GB)

(73) Assignee: Cisco Technology, Inc., San Jose, CA (US)

(*) Notice: Subject to any disclaimer, the term of this patent is extended or adjusted under 35 U.S.C. 154(b) by 11 days.

(21) Appl. No.: 15/412,782

(22) Filed: Jan. 23, 2017

(65) Prior Publication Data
US 2018/0213296 A1    Jul. 26, 2018

(51) Int. Cl.
| | |
|---|---|
| H04N 7/173 | (2011.01) |
| H04N 21/643 | (2011.01) |
| H04L 29/06 | (2006.01) |
| H04L 29/08 | (2006.01) |
| H04N 21/2343 | (2011.01) |
| H04N 21/6338 | (2011.01) |
| H04N 21/647 | (2011.01) |
| H04N 21/845 | (2011.01) |
| H04L 12/18 | (2006.01) |

(52) U.S. Cl.
CPC ... *H04N 21/64322* (2013.01); *H04L 12/1881* (2013.01); *H04L 65/601* (2013.01); *H04L 65/605* (2013.01); *H04L 65/607* (2013.01); *H04L 67/2842* (2013.01); *H04L 67/30* (2013.01); *H04N 21/23439* (2013.01); *H04N 21/6338* (2013.01); *H04N 21/64738* (2013.01); *H04N 21/8456* (2013.01); *H04L 65/102* (2013.01); *H04L 65/4084* (2013.01)

(58) Field of Classification Search
CPC .......... H04N 21/4622; H04N 21/8586; H04N 21/4788; H04N 21/4782; H04N 7/17318
USPC .............................. 725/86–116; 709/217–232
See application file for complete search history.

(56) References Cited

U.S. PATENT DOCUMENTS 7,092,044 B2 * 8/2006 Inui ........................ H04H 40/18
348/563
7,418,190 B2   8/2008 Green
(Continued)

FOREIGN PATENT DOCUMENTS

| EP | 1842337 B1 | 10/2016 |
|---|---|---|
| WO | 2006077500 A1 | 7/2006 |

*Primary Examiner* — Annan Q Shang
(74) *Attorney, Agent, or Firm* — Patterson + Sheridan, LLP

(57) ABSTRACT

Techniques are described for managing streaming video profile selections of downstream client devices for a network device. Embodiments include reserving a determined amount of bandwidth at a network gateway device, on a link between the network gateway device and an upstream network device. The network gateway device subscribes to multicast network communications for one or more video streaming profiles of a plurality of video streaming profiles for a first video content. Each of the plurality of video streaming profiles corresponds to a respective encoding of the first video content. Embodiments selectively requesting a plurality of data packets for at least one of the plurality of video streaming profiles, from at least one upstream network device, without requiring a request to be received for the at least one video streaming profiles from the one or more client devices, using at least a portion of the reserved determined amount of bandwidth.

20 Claims, 10 Drawing Sheets

(56) References Cited

U.S. PATENT DOCUMENTS

| | | | |
|---|---|---|---|
| 8,139,607 B2 * | 3/2012 | Sullivan | H04N 21/44209 370/230.1 |
| 8,230,105 B2 | 7/2012 | Melnyk et al. | |
| 8,566,887 B2 * | 10/2013 | Hasek | H04N 7/17318 725/94 |
| 8,776,161 B2 * | 7/2014 | Gazier | H04N 21/222 375/240.07 |
| 8,887,218 B2 * | 11/2014 | Fielibert | H04N 21/23608 725/116 |
| 9,277,289 B2 | 3/2016 | Medford et al. | |
| 9,560,404 B2 * | 1/2017 | Phillips | H04N 21/2402 |
| 9,826,197 B2 * | 11/2017 | Dahlby | H04N 7/17318 |
| 9,961,389 B2 * | 5/2018 | Phillips | G11B 27/10 |
| 2002/0023165 A1 | 2/2002 | Lahr | |
| 2003/0074441 A1 * | 4/2003 | Penk | H04L 41/00 709/224 |
| 2003/0122610 A1 * | 7/2003 | Zeng | H02M 3/073 327/536 |
| 2004/0019910 A1 * | 1/2004 | Grenier | H04N 21/235 725/70 |
| 2006/0095948 A1 * | 5/2006 | Verhaegh | H04N 7/17318 725/101 |
| 2007/0157280 A1 * | 7/2007 | Michael | H04H 20/30 725/126 |
| 2009/0222872 A1 * | 9/2009 | Schlack | H04N 7/173 725/114 |
| 2010/0226444 A1 | 9/2010 | Thevathasan et al. | |
| 2010/0254462 A1 | 10/2010 | Friedrich et al. | |
| 2013/0074129 A1 * | 3/2013 | Reisman | G06F 16/954 725/61 |
| 2013/0086615 A1 * | 4/2013 | Williams | H04N 21/41407 725/62 |
| 2013/0091526 A1 * | 4/2013 | Iyer | H04L 65/608 725/62 |
| 2014/0040970 A1 * | 2/2014 | Alexander | H04L 67/141 725/116 |
| 2014/0130073 A1 * | 5/2014 | Yu | H04N 21/44222 725/14 |
| 2015/0020135 A1 * | 1/2015 | Frusina | H04N 21/4621 725/116 |
| 2015/0350704 A1 * | 12/2015 | Horen | H04N 21/2393 725/95 |
| 2016/0142762 A1 * | 5/2016 | Tsukagoshi | H04N 21/236 725/116 |
| 2016/0164935 A1 * | 6/2016 | Chen | H04L 1/1877 709/219 |
| 2016/0337672 A1 * | 11/2016 | Lee | H04N 21/236 |
| 2017/0070758 A1 * | 3/2017 | Phillips | H04N 21/2385 |
| 2017/0171588 A1 * | 6/2017 | Phillips | H04N 21/6125 |

* cited by examiner

ASSISTED ACCELERATION FOR VIDEO STREAMING CLIENTS

TECHNICAL FIELD

Embodiments presented in this disclosure generally relate to streaming content, and more specifically, embodiments disclosed herein relate to techniques for optimizing ABR streams within a network.

BACKGROUND

As video transmission systems have matured, digital video is more readily available via a variety of different communications systems and networks. Specifically, digital video, such as television programs, can be transmitted as multicast digital bit streams of video signals to users over networks. Multicast digital bit streams typically include digital video frames. A predetermined number of frames is conventionally referred to as a Group of Pictures (GOP). The GOP lengths are typically 15 or 30 frames. With more advanced video formats, such as Advanced Video Coding (AVC) and/or Windows Media 9 (WM9), the GOP length can be substantially longer in order to reduce the bit rate.

In order to reduce costs and simplify the amount of effort associated with video transmission, different video compression/de-compression techniques have been developed and established. Some of the better known and more widely adopted video compression/de-compression standards include Motion Picture Experts Group 2 (MPEG-2) data streams and Motion Picture Experts Group 4 (MPEG-4) data streams. Hence, television programs are often transmitted over the network as Motion Picture Experts Group 2 (MPEG-2) data streams or Motion Picture Experts Group 4 (MPEG-4) data streams. Conventionally, for purposes of video compression/decompression, a video stream is processed one frame at a time.

Compressed video transmission streams typically include a variety of different compression frame types. With MPEG-2 and MPEG-4, the bit streams generally include three different types of frames including Intra-frames, Predictive frames, and Bidirectional interpolated frames. In a typical decoding process, Intra-frames (I-frames) can be decoded independently without the need of referencing another frame. Thus, GOPs typically start with an I-frame. Predictive frames (P-frames) can be decoded by referencing a previous I-frame or P-frame. Bidirectional interpolated frames (B-frames) can be predicted from a previous and a following P-frame or I-frame. For a given video stream, all three ways of coding are attempted and the best and most efficient combination is utilized. For example, a common MPEG-2 video stream can be 15 frames long and have the sequence IBBPBBPBBPBBPBB.

Typically, a video stream, such as a MPEG-2 data stream, is transmitted from a multicast source to a router and/or switch via a network, e.g., an Internet Protocol (IP) distribution network. And upon receipt of the video stream, the router then transmits the video stream to a user device, such as a set-top box. Such a router (e.g., the user's Internet gateway) can potentially receive multiple multicast video streams at one time (e.g., one or more streams for each of a plurality of broadcast channels), and client devices (e.g., dedicated streaming devices such as the set-top box, mobile devices, tablet devices, etc.) can request specific streams to be output for display.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
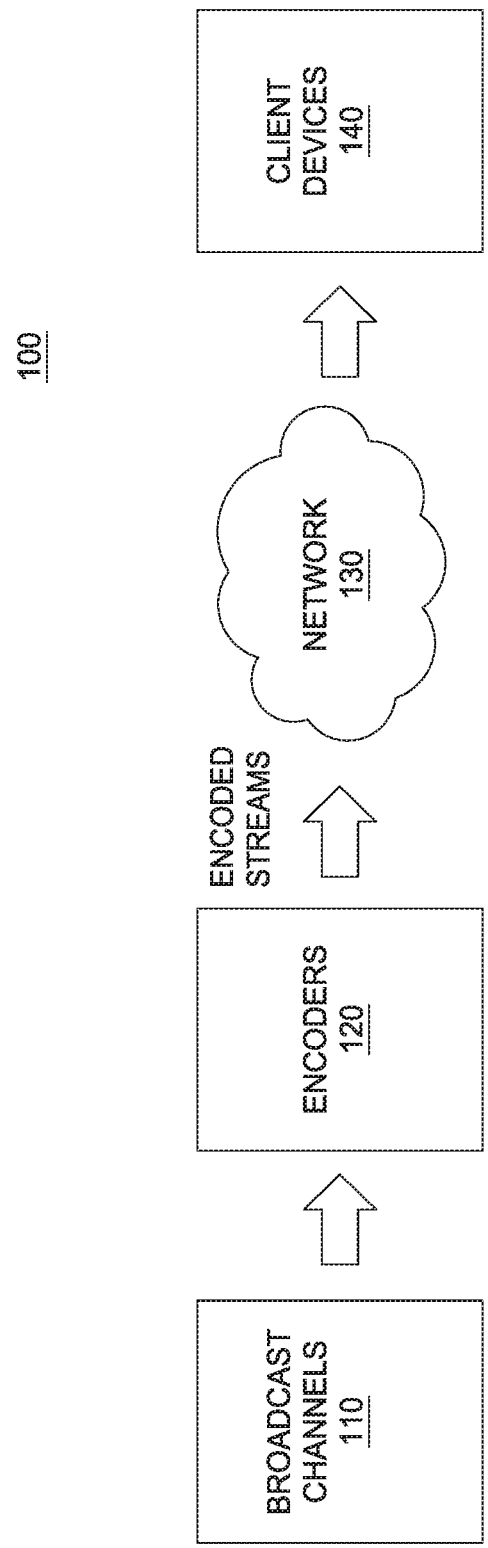
FIG. 1 illustrates a system for delivering encoded video streams to client devices configured with an Adaptive Bit rate (ABR) profile selection component, according to one embodiment described herein.

One embodiment presented in this disclosure provides a method that includes reserving a determined amount of bandwidth at a network gateway device, on a link between the network gateway device and an upstream network device. The method further includes subscribing, at the network gateway device, to multicast network communications for one or more video streaming profiles of a plurality of video streaming profiles for a first video content. Each of the plurality of video streaming profiles corresponds to a respective encoding of the first video content. Additionally, the method includes selectively requesting a plurality of data packets for at least one of the plurality of video streaming profiles, from at least one upstream network device, without requiring a request to be received for the at least one video streaming profiles from the one or more client devices, using at least a portion of the reserved determined amount of bandwidth.

Another embodiment presented in this disclosure provides a network device that includes logic configured to reserve a determined amount of bandwidth at a network gateway device, on a link between the network gateway device and an upstream network device. The logic is further configured to subscribe, at the network gateway device, to multicast network communications for one or more video streaming profiles of a plurality of video streaming profiles for a first video content. Each of the plurality of video streaming profiles corresponds to a respective encoding of the first video content. Additionally, the logic is configured to selectively request a plurality of data packets for at least one of the plurality of video streaming profiles, from at least one upstream network device, without requiring a request to be received for the at least one video streaming profiles from the one or more client devices, using at least a portion of the reserved determined amount of bandwidth.

Yet another embodiment presented in this disclosure provides a method that includes subscribing, at a network gateway device, to multicast network communications for one or more video streaming profiles of a plurality of video streaming profiles for a first video content. Each of the plurality of video streaming profiles corresponds to a respective encoding of the first video content at a respective bitrate. The method includes determining a lowest bitrate video streaming profile, of the plurality of video streaming profiles for the first video content. Additionally, the method includes retrieving two or more data packets for the determined lowest bitrate video streaming profile. The method further includes iteratively retrieving data packets from next lowest bitrate video streaming profiles for the first video content, until one or more criteria are satisfied. The method includes storing received data packets within a cache on the network gateway device. Upon receiving a request from a downstream client device requesting data for a first one of the plurality of video streaming profiles, the method includes transmitting data packets from the cache to the downstream client device.

Example Embodiments

In many instances, content providers can provide multiple Adaptive Bit rate (ABR) streams for a single broadcast channel. Generally speaking, multiple different ABR streams (e.g., at varying bit rates) can be provided for each of a plurality of broadcast channels, and client devices can be configured with logic to select one of the ABR streams can that is optimal for the given client device. That is, it is generally preferable for a client device to display the highest quality video stream possible, and since network resources and processing capabilities can vary greatly between client devices, the optimal video stream can vary greatly between client devices. As an example, a very high bit rate encoding may be optimal for a dedicated streaming device on a high-speed network, while a relatively lower bit rate encoding may be optimal for a mobile device on a mobile network. As such, by providing multiple encodings at varying bit rates for each broadcast channel, content providers can better ensure that client devices can retrieve a stream that is close to optimal for the particular client device.

Many video clients are configured with logic to dynamically select between a plurality of video streaming profiles for a given instance of video content. For example, a content distribution network (CDN) could provide a plurality of different video streaming profiles for the instance of video content, with each profile corresponding to a respective instance of the video content encoded in a respective bit rate. Generally, such video clients monitor the time at which they receive packets of video data and to scale the video streaming profile accordingly. For example, upon determining that the packets are not being received fast enough, the client devices could select a lower bit rate profile to help prevent buffer underrun and pausing of the streaming video. As another example, when the client determines that the video data is being received sufficiently quickly, the client could request a higher bit rate profile to improve the quality of the video streaming experience.

Generally, multicast ABR solutions have a sender device that extracts data for each available ABR profile from a source and transmits the data for each profile to its own multicast IP destination. For example, each ABR profile can correspond to a respective bit rate encoding of video content. When requesting video data for a video stream, the requests from the client video players can be redirected to from their local receiver device (e.g., a network gateway device for a home network, a set-top box, etc.). Generally, the client can specify the video stream being requested (e.g., using a unique identifier corresponding to the video stream) and an ABR profile for the video stream that should be used. To supply video segments from the video stream, the receiver device can subscribe to the multicast stream containing the specified ABR profile.

As the ABR profile in such an example is selected by the client device, a network device (e.g., a network device managed by an Internet Service Provider (ISP) that processes requests for a substantial number of home networks and client devices) can be forced to subscribe to a significant number of multicast streams for ABR profiles of various video streams from an upstream network device. Likewise, the upstream network device will need to subscribe to the multicast streams as well, and so on until the content is received directly from the source (e.g., a Content Distribution Network (CDN). Even within a given network, various client devices may requests different ABR profiles (e.g., a set-top box device may request a highest quality ABR profile, while a mobile device with a weaker Wi-Fi® connection may request a lower quality ABR profile due to the perceived lack of bandwidth, while another computing device could request a lower quality ABR profile due to the computing device outputting at a lower screen resolution). Thus, even within the same local network, different client devices may request different ABR profiles, further increasing the number of multicast subscriptions needed by upstream network devices.

Generally, when a video player on a client device downloads a packet faster than it takes to consume the video data contained within the packet, the video player can determine that the download of the packet (which is of known size) will complete sufficiently quickly by measuring the bit rate during the time the packet was being downloaded. As such, the video player will remain on the current ABR profile. When downloading a subsequent packet where the bit rate is lower, but still sufficient for the player to determine that the packet will be downloaded at a rate faster than consumption, the video player can choose to remain on the current ABR profile. At some point, where the video player determines that the download of a packet will exceed the time that it would take to consume the packet (risking a decoder underrun), the video player can take corrective action, abandoning the download of the packet at that bit rate and opting to download a lower bit rate version of the packet. While downloading the lower bit rate packet, the video player can again check whether the time required to download the packet at the then available bit rate is sufficient once again. The video player could continue to download lower bit rate packets, upon determining that such downloads will complete sufficiently quickly to be played back on schedule, but the downloads are not occurring quickly enough to warrant attempting to download the packets at a higher bit rate ABR profile. If the video player subsequently determines that there is sufficient speed to abandon the download of the lower bit rate packet and attempt to download the high bit rate packet, the video player can then request data packets for the higher bit rate BR profile.

While such video player logic can account for certain network conditions (e.g., local network conditions), ultimately the video player is unable to determine conditions on the network as a whole (e.g., where ample bandwidth may be available on the local network, but network congestion is occurring at an upstream network device subscribing to multicast transmissions of the streaming video data packets). For instance, one situation in which video player logic can struggle to make an optimal decision is when a network gateway device has already cached particular data packets for an ABR profile of a particular instance of video content (e.g., a broadcast television channel). For example; a network gateway device could be configured to subscribe to multicast data packets for a highest bit rate ABR profile for a broadcast channel it to cache these data packets for client consumption. Such a configuration can save a significant amount of bandwidth when multiple client devices on the network are retrieving the data packets from the cache, rather than creating separate TCP unicast connections with a content server.

However, in some circumstances, the client devices may have no way of knowing that the highest bit rate ABR profile data packets are cached on the network gateway device. As such, a client device could begin requesting data packets for a lower bit rate ABR profile for the content item, and could dynamically scale the ABR profile with the available bandwidth perceived by the client device. In some circumstances, the client device may perceive the available bandwidth to be insufficient for downloading data packets according to the highest bit rate ABR profile, and thus may never request data packets from the highest bit rate ABR profile (which, in this example, are cached on the network gateway device). As such, even though the data packets for the highest bit rate ABR profile could be delivered to the client device from the network gateway device's cache, the client device may never select the highest bit rate ABR profile due to the client device's perception of the available network bandwidth. Moreover, this problem can compound when multiple client devices on the network are making non-optimal ABR profile selections, as the multiple client devices may select different lower bit rate ABR profiles, causing data packets from these different ABR profiles to be downloaded by the network gateway device in addition to the highest bit rate ABR profile data packets. Additionally, the client devices making the non-optimal ABR profile selections may contend with one another for the available bandwidth, and this contention can lead to the client devices frequently switching between various ABR profiles, with none of the client devices reaching the optimal highest bit rate ABR profile for which data packets are cached on the network gateway device.

As such, embodiments described herein provide techniques for influencing the behavior of video player client devices. According to one embodiment, a network gateway device can reserve a determined amount of bandwidth at a network gateway device, on a link between the network gateway device and an upstream network device. The network gateway device can subscribe, at the network gateway device, to multicast network communications for one or more video streaming profiles of a plurality of video streaming profiles for a first video content. Each of the plurality of video streaming profiles corresponds to a respective encoding of the first video content. According to various embodiments, the network gateway device can reserve differing amounts of network bandwidth and can subscribe to multicast network communications for various video streaming profiles. Generally, the network gateway device can cache the data packets received for the subscribed video streaming profiles, and can provide these data packets to client devices on the network upon request.

In one embodiment, the network gateway device can subscribe to a highest bit rate ABR profile and can reserve an amount of bandwidth determined to be needed to download data packets for the highest bit rate ABR profile in a timely manner (i.e., in sufficient time for playback on a client device). In another embodiment, the network gateway device can subscribe to the top two highest bit rate ABR profiles for a given instance of video content, and can reserve an amount of bandwidth determined to be needed to download the data packets for the top two ABR profiles in a timely manner. More generally, any ABR profile selection and determined amount of bandwidth can be used, consistent with the functionality described herein and according to available network resources for a given implementation.

The network gateway device can selectively request a plurality of data packets for at least one of the plurality of video streaming profiles, from at least one upstream network device, using at least a portion of the reserved determined amount of bandwidth. In one embodiment, the network gateway device is configured to selectively request the data packets without requiring a request to be received for the at least one video streaming profiles from the one or more client devices. As an example, the network gateway device could retrieve a defined number of data packets (e.g., a complete ABR segment) for a lowest bit rate ABR profile for the content item. The network gateway device could then subscribe to multicast data communications for a next highest bit rate ABR profile, relative to the lowest bit rate ABR profile, and could retrieve a defined number of data packets from the next lowest bit rate ABR profile. The network gateway device could continue this behavior, until a threshold ABR profile is reached. For example, such a threshold ABR profile could be one of the ABR profiles for which data packets are already cached on the network gateway device. By doing so, the network gateway device can provide an assisted acceleration mechanic for client devices, thereby indirectly controlling the client devices and causing them to request data packets from one of the already cached ABR profiles.

FIG. 1 illustrates a system for delivering encoded video streams to client devices, according to one embodiment described herein. As shown, the system 100 includes a plurality of broadcast channels 110, a plurality of encoders 120, a network 130 and a plurality of client devices 140. Generally, a master video stream is provided for each of the broadcast channels 110. Such a master video stream is typically a high resolution video stream containing video content for the corresponding broadcast channel. The encoders 120 can then process the master video streams for the broadcast channels 110 to produce encoded ABR video streams. For example, three of the encoders 120 could be assigned to a particular one of the broadcast channels 110, and each of the three encoders could be configured to transcode the master video stream for the broadcast channel at a different bit rate. As an example, the three encoders could be configured to encode the master video stream for the broadcast channel at a relatively high bit rate, a relatively moderate bit rate and a relatively low bit rate.

The encoded streams could then be transmitted to the client devices 140 using the network 130. In doing so, the content provider could generate a manifest file specifying that the particular broadcast channel is available in the three different bit rates, and could transmit such a manifest file to the client devices 140 using the network 130. Each of the client devices 140 could be configured to process the manifest file and to determine which of the available bit rates is optimal for the particular client device. For example, a mobile client device could be configured to select the relatively low bit rate encoding, while a dedicated video streaming device on a high-speed network connection could be configured to select the relatively high bit rate encoding. Depending on the performance of the streaming of the selected encoding, the client devices could then dynamically adjust their selected encoding. Continuing the above example, if the mobile client device determines that data packets for the video stream are arriving well in advance of their playback time, the mobile client device could request to begin receiving data packets from the moderate bit rate encoding stream. As another example, if the dedicated streaming client device determines that packets are not arriving as quickly as expected and that buffer underrun is likely to occur, the dedicated streaming client device could request to begin receiving data packets from the moderate bit rate encoding stream.

According to one embodiment described herein, a network device within the network 130 can be configured to manage streaming video profile selections of downstream client devices 140. For example, such a network device could be configured with a video streaming management component, that is configured to receive multicast network communications for a first video streaming profile of a plurality of video streaming profiles, for a video content item. Generally, each of the plurality of video streaming profiles can correspond to video content encoded in a distinct manner (e.g., at a distinct bit rate). Such a network device can be subscribed to multicast communications from an upstream network device within the network 130, for a video stream corresponding to the first video streaming profile. Such a subscription can be semi-permanent (e.g., each day when the system is operating properly, multicast data corresponding to the video stream will be transmitted to the network device), for example for broadcast channel implementations, or can be dynamic (e.g., responsive to an occurrence of a particular event).

Logic on the network device within the network 130 could be configured to perform an existed acceleration mechanic for client devices 140 on the network device's local network. For example, the network device logic could request data packets from a lowest bit rate ABR profile for a given content item (e.g., a broadcast television channel, a live sporting event, etc.), and could cache the received data packets for the lowest bit rate ABR profile for client consumption. After a defined number of data packets for the lowest bit rate ABR profile have been received, the network device logic could request data packets from a second lowest bit rate ABR profile. The network device logic could continue to request a number of data packets from increasingly higher bit rate ABR profiles, until then already subscribed ABR profile for the content item is reached. The network device logic could then return to requesting data packets for the lowest bit rate ABR profile, and the process could repeat again.

By doing so, the client devices 140 on the local network can indirectly be influenced to request data packets for an already cached ABR profile for the content item. For purposes of this example, assume that a client device is requesting data packets for the lowest bit rate ABR profile for the content item. When the network device logic preemptively requests and caches the data packets for the lowest bit rate ABR profile, the client device will perceive the data packets as being delivered well in advance of their scheduled playback time (i.e., because they are being delivered from the cache on the network device over the local network connection). In response, the client device may begin requesting data packets from the next highest bit rate ABR profile, as the client device may infer that the fast delivery of the data packets indicates that additional network bandwidth is available for streaming data. When the network device logic then caches data packets for the next highest bit rate ABR profile, the client device may again infer that additional bandwidth is available and may again switch to the next highest ABR profile. This process can continue, until the client device begins requesting data packets from one of the already subscribed ABR profiles on the network device. As such, embodiments provide an assisted acceleration mechanic that can help client devices select for a given an optimal ABR profile, without requiring any specialized logic on the client devices for determining which ABR profiles are cached on the network device and without requiring the client devices to even know which ABR profiles are cached on the client device.

Figure 2:
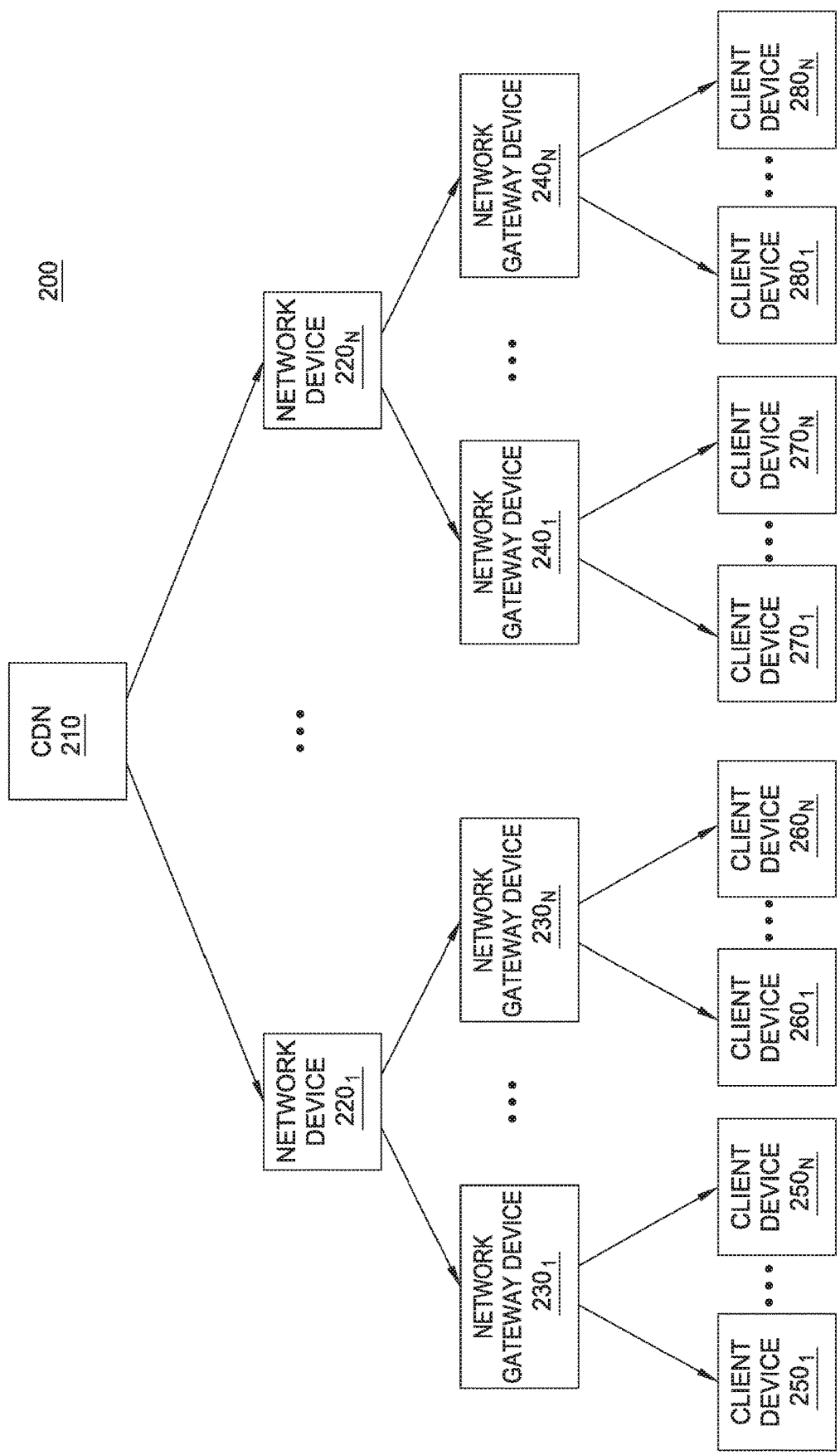
FIG. 2 illustrates a network topology for delivering encoded video streams to client devices, according to one embodiment described herein.

Generally, the encoded video streams generated by the encoders 120 can be transmitted to the client devices 140 using the network 130 in of different ways. One such way is through multicast communications, where encoded video streams are transmitted to all subscribing network devices within the network. FIG. 2 illustrates a network topology for delivering encoded video streams to client devices, according to one embodiment described herein. As shown, the network topology 200 includes a CDN 210, network devices 220$_{1-N}$, network gateway devices 230$_{1-N}$ and 240$_{1-N}$, and client devices 250$_{1-N}$, 260$_{1-N}$, 270$_{1-N}$, and 280$_{1-N}$. In the depicted example, the network gateway devices 230$_{1-N}$ and 240$_{1-N}$ are configured to also serve as a router for a home network. Thus, for example, the client set-top box 240$_1$ is configured to act as a router for the client device 270$_{1-N}$.

In the depicted example, if the client device 270$_1$ requests a particular encoded video stream for a particular broadcast channel, the client set-top box 240$_1$ can be configured to subscribe to multicast transmissions from the network device 220$_N$ for the particular encoded video stream. In turn, the network device 220N can subscribe to multicast transmissions from the CDN 210 for the particular encoded video stream. One advantage to such an embodiment is that the data packets for the particular encoded video stream can more easily be delivered to additional devices within the network topology 200. For example, if the client device 270$_N$ also requests the particular encoded video stream for the particular broadcast channel, the client set-top box 240$_1$ can simply provide the client device 270$_N$ with the data packets for the particular encoded video stream already being received due to the client device 270$_1$'s request. In other words, the particular encoded video stream can be provided to the client device 270$_N$ without creating an additional network connection with the CDN 210, thereby reducing the workload on the CDN 210, the network device 220$_N$ and the client set-top box 240$_1$.m In some instances, the network gateway devices 230$_{1-N}$ and 240$_{1-N}$ are configured to subscribe to multicast transmissions for at least one video stream for each of the broadcast channels 110. In turn, the network devices 220$_{1-N}$ can subscribe to multicast transmissions for the at least one video stream for each of the broadcast channels 110. While such an embodiment creates a constant flow of network traffic between the CDN 210 and the network devices $220_{1-N}$, and between the network devices $220_{1-N}$ and the network gateway devices $230_{1-N}$ and $240_{1-N}$, it enables any of the client devices $250_{1-N}$, $260_{1-N}$, $270_{1-N}$, and $280_{1-N}$ to retrieve data packets for the requested video streams from the corresponding client set-top box, using a local (and much faster) network connection. Moreover, regardless of the number of client devices $250_{1-N}$, $260_{1-N}$, $270_{1-N}$, and $280_{1-N}$, the workload on the CDN 210 remains constant, unlike conventional solutions where each of the client devices is configured to establish a separate network connection with the CDN 210 for streaming video content. As such, by transmitting the video streams through multicast transmission techniques, embodiments provide a more scalable video streaming solution relative to conventional techniques.

In the context of the present disclosure, one or more of the network devices $220_{1-N}$ and the network gateway devices $230_{1-N}$ and $240_{1-N}$ can be configured with a video streaming management component that is configured to selectively influence the behavior of downstream client devices (e.g., client devices $250_{1-N}$, $260_{1-N}$, $270_{1-N}$, and $280_{1-N}$). For example, the network gateway device $230_1$ could subscribe to multicast communications for a highest bit rate ABR profile for a given content item from the network device $220_1$, and the network device $220_1$ could be subscribed to multicast communications for the highest bit rate ABR profile for the given content item from the CDN 210. Upon receiving the data packets for the highest bit rate ABR profile, the network gateway device $230_1$ could store the data packets in a cache for consumption by the client devices $250_{1-N}$. For instance, requests from the client devices $250_{1-N}$ to the CDN 201 for data packets from the highest bit rate ABR profile could be redirected to cache, rather than the CDN 210. The network gateway device $230_1$ could be configured with a video streaming management component that iteratively requests a defined number of data packets from increasingly higher bit rate ABR profiles, until the highest bit rate ABR profile is reached. Doing so provides an assisted acceleration mechanic that influences the client devices $250_{1-N}$ to switch to the highest bit rate ABR profile, for which data packets are already cached on the network device $230_1$.

Figure 3:
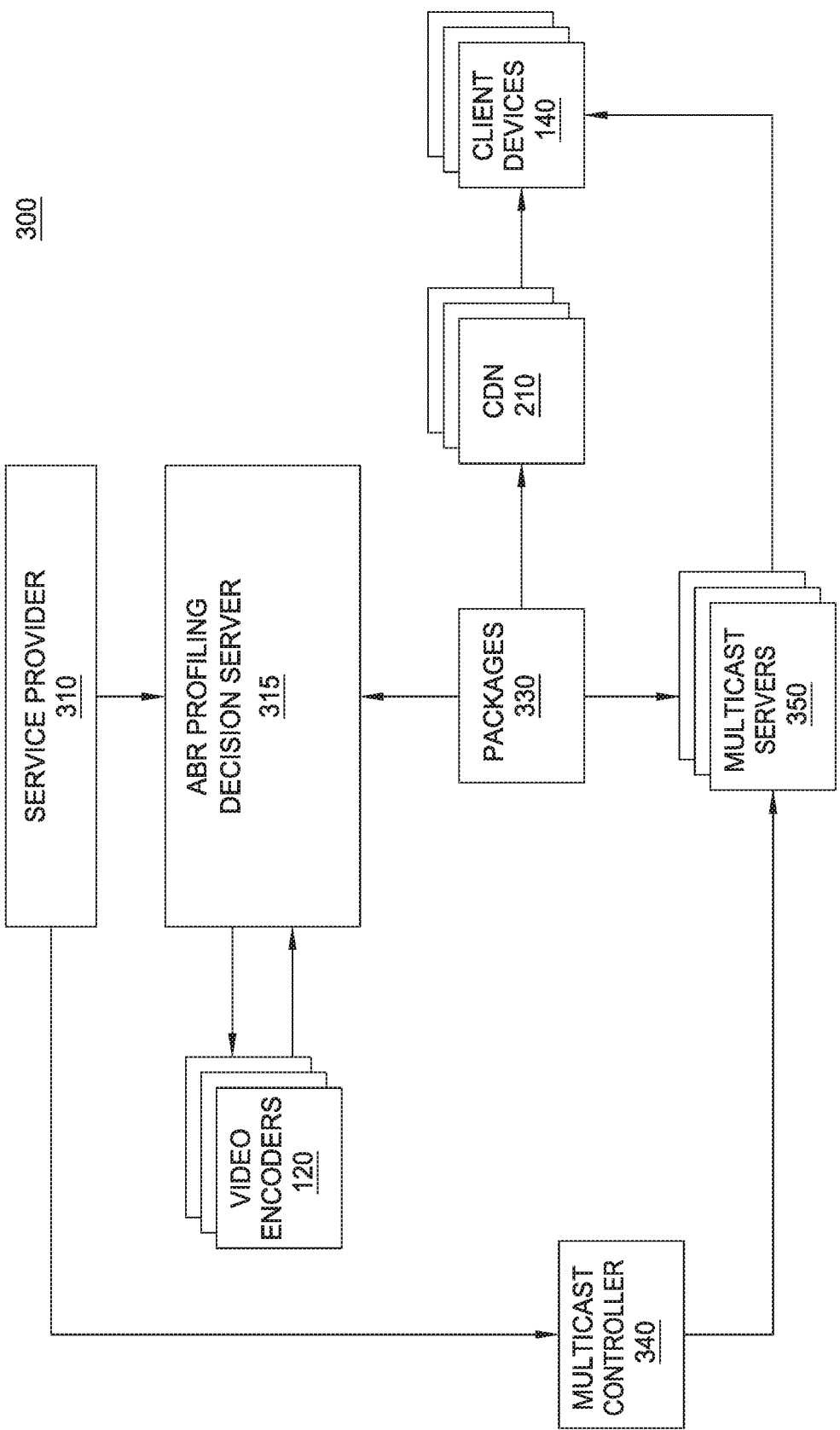
FIG. 3 illustrates a network topology for delivering encoded video streams to client devices, according to one embodiment described herein.

FIG. 3 illustrates a network topology for delivering encoded video streams to client devices, according to one embodiment described herein. As shown, the system 300 includes a service provide 310, an ABR profile decision server 315, a plurality of video encoders 120, packagers 330, CDNs 210, client devices 140, a multicast controller 340 and multicast servers 350.

Generally, the ABR profile decision server 315 is configured to determine an optimal allocation of the video encoders 120 to various broadcast channels, in order to optimally deliver ABR streams to the client devices 140. The ABR profile decision server 315 could then determine an optimal assignment of the set of available video encoders to the plurality of broadcast channels, by, for each of the plurality of broadcast channels, determining a respective number of video encoders to assign to the broadcast channel, based on the client consumption information, and determining a respective set of ABR streams to provide for the broadcast channel, using the assigned video encoders. In one embodiment, in determining the optimal allocation of the video encoders 120 to broadcast channels, the ABR profile decision server 315 is configured to scale the number of encoders 120 assigned to a given broadcast channel with the client demand for the broadcast channel. For example, a relatively popular broadcast channel may receive additional video encoders 120, to help assure that an optimal bit rate encoding is available for each of the client devices watching the popular broadcast channel. Doing so helps to ensure a positive streaming experience for the greatest number of users of the client devices 140. In doing so, however, the ABR profile decision server 315 can be configured to assign no less than a minimum threshold of encoders per broadcast channel. In some situations, where a particular broadcast channel is extremely unpopular, the ABR profile decision server 315 could assign only 1 or 2 encoders to the channel, as very few users will be affected if the channel is not available in an optimal bandwidth for certain client devices.

The video encoders 120 can then encode the master streams for their assigned broadcast channel to produce the ABR streams at their respective assigned bit rate. The encoded streams can then be processed by the packagers 330, which can provide the encoded ABR content to the CDN 210 and the multicast servers 350 for delivery to the client devices 140. Additionally, the packagers 330 can provide client consumption information back to the ABR profile decision server 315, for use in refining the allocation of the video encoders 120 to the broadcast channels. In the depicted embodiment, the CDNs 210 can be configured to deliver the encoded ABR streams to particular client devices 140 using unicast transmissions, while the multicast servers 350 can be configured to deliver the encoded ABR streams to other client devices 140 using multicast transmissions. The client devices 140 can be configured to report back client consumption information to the ABR profile decision server 315. Such consumption information can include, for example, which broadcast channels are selected, which ABR streams are selected, and so on. The ABR profile decision server 315 could then use such information to refine the allocation of video encoders 120 to the broadcast channels.

Figure 4:
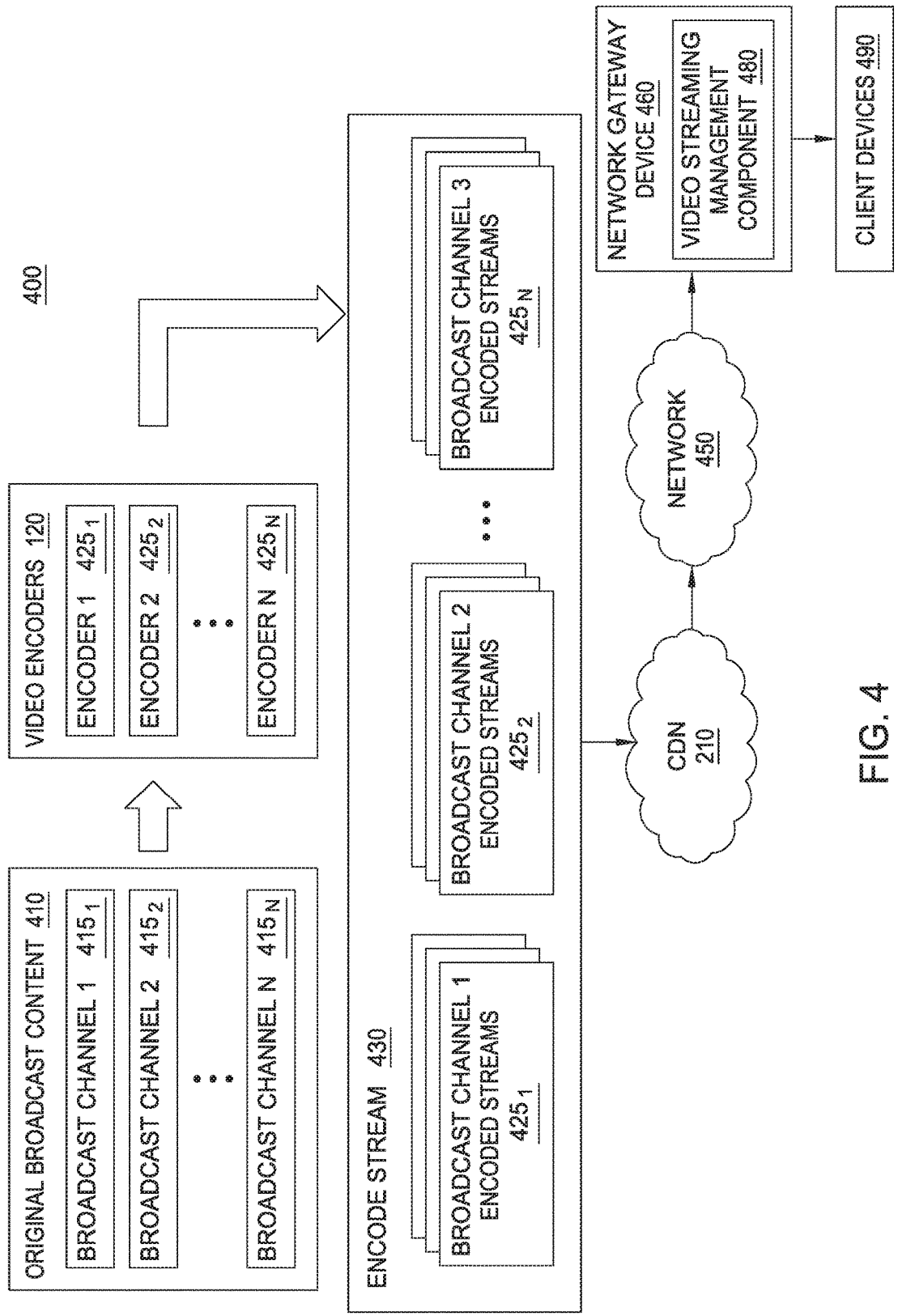
FIG. 4 illustrates a workflow for providing encoded ABR video content for a plurality of broadcast channels, according to one embodiment described herein.

FIG. 4 illustrates a workflow for providing encoded ABR video content for a plurality of broadcast channels, according to one embodiment described herein. As shown, the workflow 400 illustrates original broadcast content 410 (also referred to herein as master streams for broadcast channels), video encoders 120, encoded streams 430, CDN 210, network 450, network gateway device 460 and client devices 490. Generally, the ABR profile decision server 315 can determine an optimal encoding of the video encoders 120, such that no less than a minimum threshold and no more of a maximum threshold of the encoders $415_{1-N}$ is assigned to each of the broadcast channels $415_{1-N}$. The encoded ABR video streams 430 produced by the encoders $415_{1-N}$, depicted as the broadcast channel encoded streams $425_{1-N}$, can then be provided to CDN 210 for distribution to client devices. As discussed above, the CDN 210 can be configured to provide the encoded streams 430 to the client devices using various techniques (e.g., unicast communications, multicast communications, etc.). In a particular embodiment, the CDN 210 is configured to transmit requested streams to the client devices using unicast communications, and the encoded streams 430 can also be provided to a multicast server (not shown) for transmission to client devices using multicast communications.

The network gateway device 460 generally represents a network gateway for a local network that includes the client devices 490. For example, the network gateway device 460 could be a wireless router for a home network. The network gateway device 460 is configured with a video streaming management component 480. In one embodiment, the video streaming management component 480 is configured to provide assisted video streaming acceleration for the client devices 490. For example, the video streaming management component 480 could reserve an amount of bandwidth on a link between the network gateway device 460 and the network 450. Generally, the reserved amount of bandwidth represents an amount of bandwidth that is needed to perform the assisted acceleration operation for the client devices 490. For example, in one embodiment, the reserved amount of bandwidth corresponds to an amount of bandwidth needed to download data packets from the ABR profile that is just below the subscribed ABR profile.

The video streaming management component 480 could subscribe to data communications for a lowest bit rate ABR profile from an upstream network device in the network 450. The video streaming management component 480 could store the data packets received for the lowest bit rate ABR profile in a cache on the network gateway device 460, and requests for data packets for the lowest bit rate ABR profile from the client devices 490 could be fulfilled using the cached data packets (i.e., as opposed to forwarding such requests to the CDN 210). Upon receiving a defined number of data packets for the lowest bit rate ABR profile, the video streaming management component 480 could unsubscribe to the data communications for the lowest bit rate ABR profile, and could subscribe to data communications from the upstream network device for a next lowest bit rate ABR profile. Again, the video streaming management component 480 could cache the data packets for the next lowest bit rate ABR profile, for use in fulfilling requests from the client devices 490. The video streaming management component 480 could repeat this process, until reaching an ABR profile for which the network gateway device 460 is already subscribed. By doing so, the video streaming management component 480 can provide an assisted acceleration service for the client devices 490.

Figure 5A:
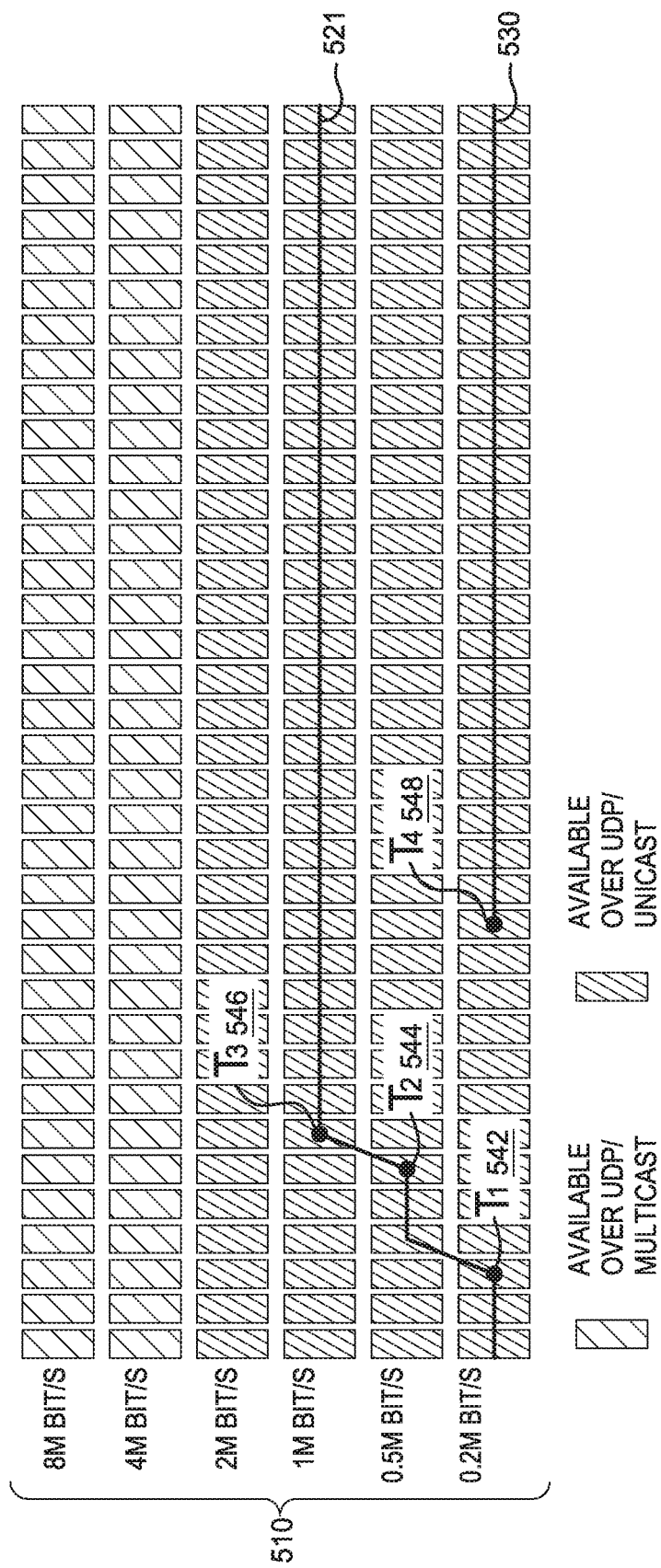
FIGS. 5A-B are graphs illustrating a method of managing video streaming profile selections of a client device, according to one embodiment described herein.
Figure 5B:
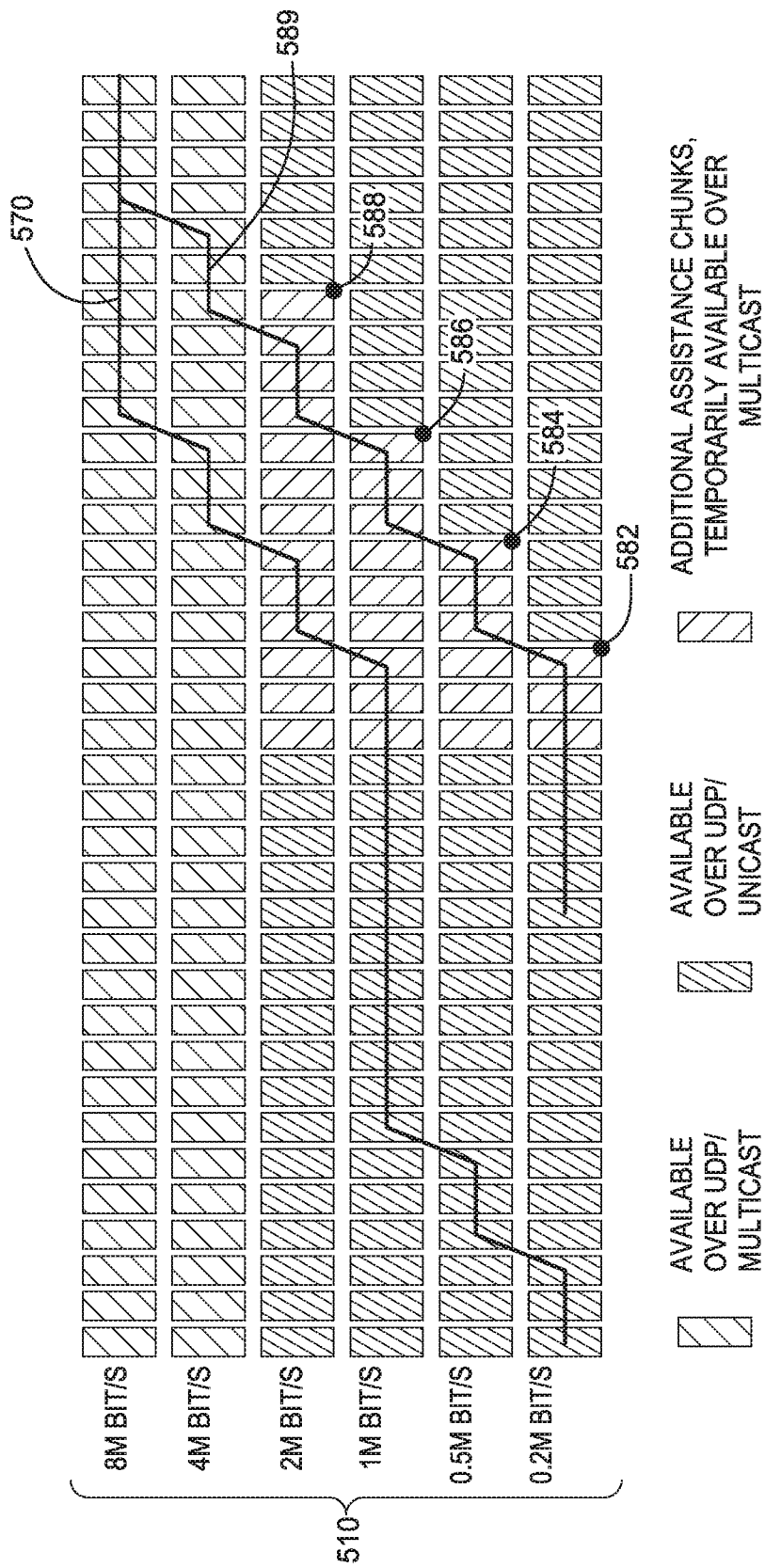

FIGS. 5A-B are graphs illustrating a method of managing video streaming profile selections of a client device, according to one embodiment described herein. As shown, the graph 500 of FIG. 5A illustrates requests for data packets for various ABR profiles over a window of time from two client devices. In the depicted embodiment, ABR profiles 510 of varying bit rates are provided (e.g., by CDN 210) for the given instance of video content, with bit rates ranging from 0.2 Mb per second to 8 Mb per second. The graph 500 includes a first line 521 representing requested data packets for a first client device, and a second line 530 representing requested data packets for a second client device. As illustrated, the first client device begins requesting data packets from the 0.2 Mb per second ABR profile. At time $T_1$ 542, the first client device determines that additional bandwidth appears to be available on the network (e.g., based on data packets for the 0.2 Mb per second ABR profile arriving sufficiently in advance of their scheduled playback time) and begins requesting data packets from the 0.5 Mb per second ABR profile. Again at time $T_2$ 544, the first client device determines that additional bandwidth appears to be available and begins requesting data packets from the 1 Mb per second ABR profile.

At time $T_3$ 546, the first client device determines that the 1 Mb per second ABR profile is the highest bid rate ABR profile that can be retrieved based on the perceived network bandwidth, and thus remains on the 1 Mb per second ABR profile. However, such a determination by the first client device is non-optimal, as in the depicted example the 4 and 8 Mb per second ABR profiles are available over multicast communications and are already cached on the local network gateway device. As such, by requesting data packets from the 0.2, 0.5 and 1 Mb per second ABR profiles, the first client device is actually using more network bandwidth for the local network connection, then if the first client device requested data packets from the significantly higher 8 Mb per second ABR profile. That is, because the data packets from the 8 Mb per second ABR profile are already available in the local cache, these data packets could be delivered to the first client device locally. However, because the logic on the client device does not have this information and is not configured with logic to make such a determination, the overall state of the network is in a non-optimal configuration.

Likewise, at time $T_4$ 548, also begins streaming the instance of video content, and again starts by requesting data packets from the 0.2 Mb per second ABR profile. For purposes of the present example, assume that remaining network bandwidth for the network is only sufficient to support the 0.2 Mb per second ABR profile, and there is not sufficient network bandwidth remaining for the second client device to request data packets from the 0.5 Mb per second ABR profile. As such, the second client device remains on the 0.2 Mb per second ABR profile. Of note, was the second client device to request data packets from the 1, 4 or 8 Mb per second ABR profiles, these data packets could be delivered to the second device in time for playback, as they are already being cached on the network gateway device for the local network. However, because the second client device is configured to select an ABR profile based on the perceived amount of network bandwidth available, the second client device makes the non-optimal selection of remaining on the lowest quality 0.2 Mb per second ABR profile.

FIG. 5B illustrates a graph depicting the behavior of the first and second client devices, with the existed acceleration service provided by the video streaming management component. As shown, the video streaming management component 480 requests a number of data packets 582 from the 0.2 Mb per second ABR profile. The video streaming management component 480 can cache these data packets and client requests for the 0.2 Mb per second ABR profile can be redirected to the cache. The video streaming management component 480 further requests data packets 584 for the 0.5 Mb per second ABR profile, followed by data packets from the 1 Mb per second ABR profile 586, and data packets 588 from the 2 Mb per second ABR profile.

As discussed above, as requests fulfilled using data packets that are already cached on the network gateway device are generally fulfilled much more quickly than requests fulfilled by a unicast connection to the CDN 210, client devices receiving these data packets may determine that the perceived amount of available network bandwidth is sufficient to support streaming at a higher bit rate ABR profile. In the depicted example, the second client device determines that sufficient network bandwidth is available and begins requesting data packets from the 0.5 Mb per second ABR profile. As the video streaming management component 480 has already cached the data packets 584 for the 0.5 Mb per second ABR profile, again these data packets are delivered to the second client device from the cache over the local network connection, with the result being a second client device receives these data packets well in advance of their scheduled playback time. As a result, the second client device begins requesting data packets from the 1 Mb per second ABR profile, followed by data packets from the 2 Mb per second ABR profile, the 4 Mb per second ABR profile at point 589, and ultimately the 8 Mb per second ABR profile.

Likewise, the first client device, upon determining that the data packets for the 1 Mb per second ABR profile were delivered well in advance of their playback time (i.e., as the data packets were delivered from the cache on the network gateway device and using the local network connection), the first client devices begins requesting data packets for the 2 Mb per second ABR profile, the 4 Mb per second ABR profile at point 589, and ultimately the 8 Mb per second ABR profile at point 570. As a result, both the first and second client devices settle on the highest quality ABR profile (i.e., the 8 Mb per second ABR profile, in the present example), which was already available in the cache of the network gateway device. Doing so provides a mechanic for influencing the behavior of client devices to take advantage of already cached data packets, without requiring any specialized knowledge or logic on the client devices.

Figure 6:
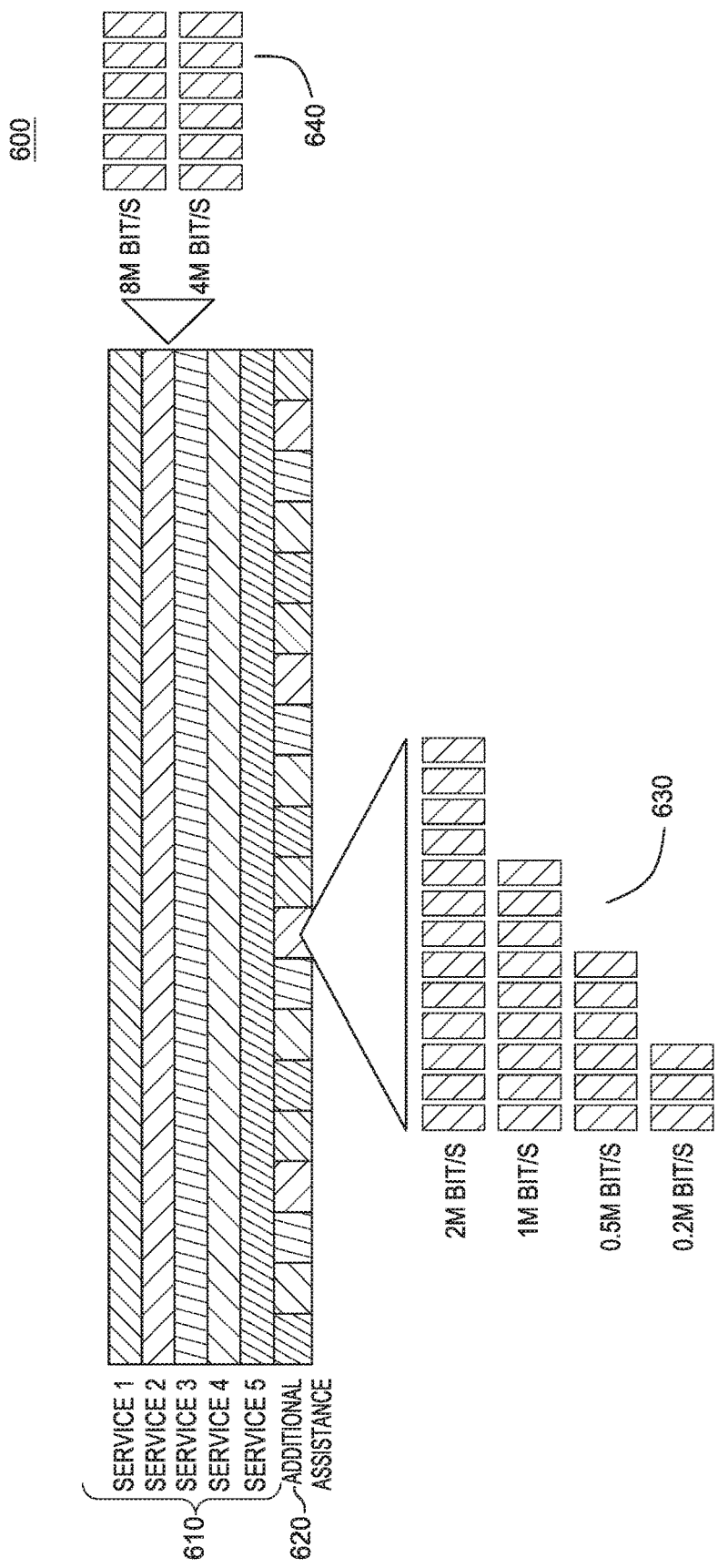
FIG. 6 is a block diagram illustrating a sequence for providing assisted acceleration for video streaming clients, according to one embodiment described herein.

In one embodiment, the video streaming management component 480 is configured to provide assisted acceleration services for multiple video services (e.g., multiple broadcast television channels). An example of this is shown in FIG. 6, which is a graph illustrating a sequence for providing assisted acceleration for video streaming clients. As shown, the graph 600 illustrates various video services 610 for which data is being requested over UDP/multicast communications. For example, a network gateway device could subscribe to multicast data communications for one or more ABR profiles for each of the services 610. In the depicted example, the network gateway device is subscribed to 4 and 8 Mb per second ABR profiles 640 for the service 2. In one embodiment, the network gateway device can be configured to subscribe to various ABR profiles for each of the services 610, e.g., with more ABR profiles of varying bit rates being subscribed to for more popular services.

In the depicted embodiment, the video streaming management component 480 is providing acceleration assistance 620 for the various services 610. As shown, the graph 630 illustrates acceleration assistance services being provided for the video service 2. In providing the acceleration assistance, the video streaming management component 480 can begin requesting data packets for the lowest bit rate ABR profile (i.e., 0.2 Mb per second in the depicted example) and can iteratively request data packets from increasingly higher bit rate ABR profiles over time. The data packets received for these ABR profiles can be cached on the network gateway device and can be provided to client devices upon request. In doing so, the video streaming management component 480 can redirect client requests intended for the CDN 210 to the cache, when the requested data is already available on the network gateway device. By doing so, the video streaming management component 480 can assist client devices in requesting data packets from the ABR profiles already being delivered to the network gateway device, e.g., the 4 and 8 Mb per second ABR profiles 640 in the present example.

Figure 7:
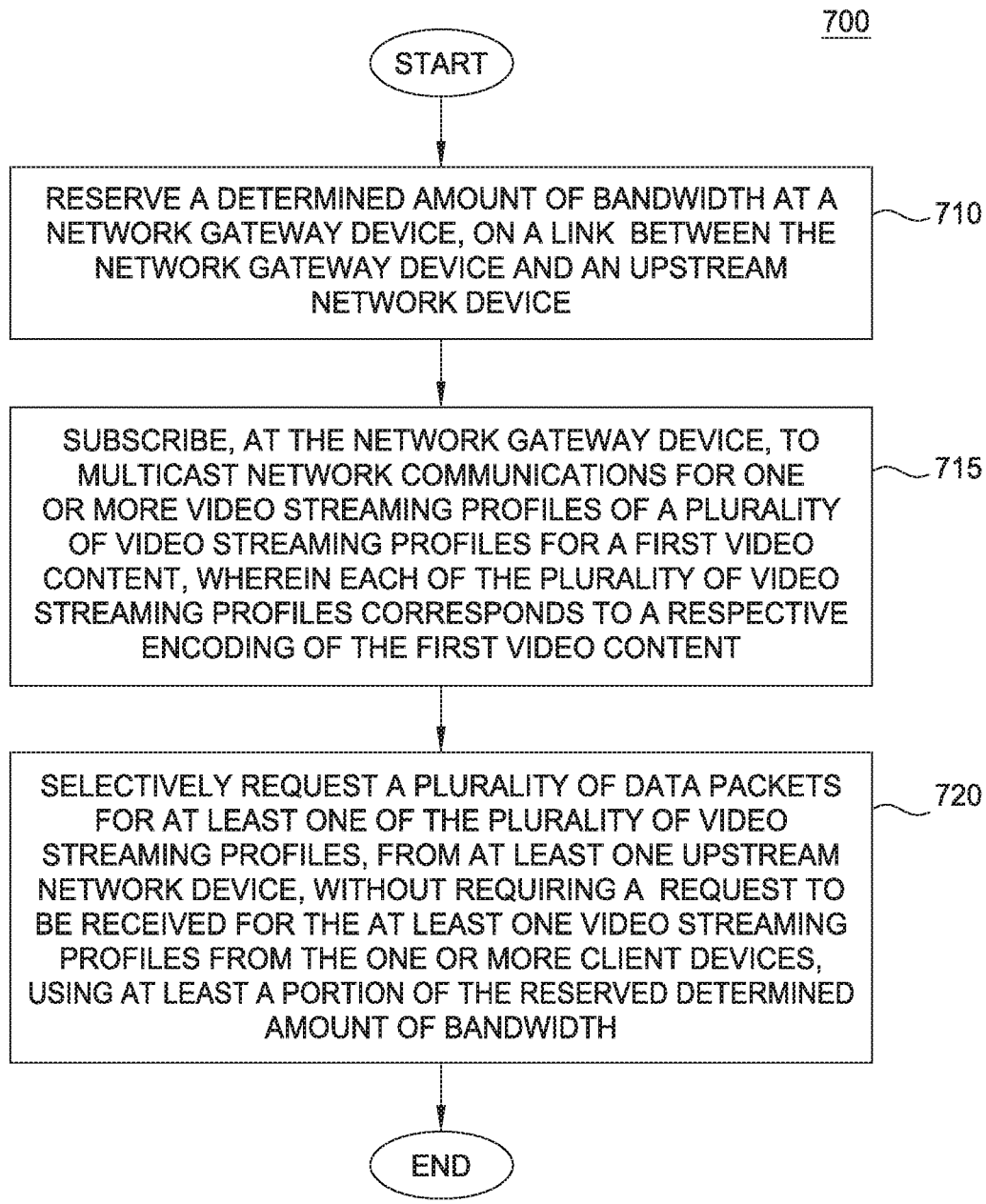
FIG. 7 is a flow diagram illustrating a method of providing assisted acceleration for a video streaming client, according to one embodiment described herein.

FIG. 7 is a flow diagram illustrating a method of providing assisted acceleration for a video streaming client, according to one embodiment described herein. As shown, the method 700 begins at block 710, where a video streaming management component 480 reserves a determined amount of bandwidth at a network gateway device, on a link between the network gateway device and an upstream network device. For example, the video streaming management component 45 could be configured to reserve an amount of bandwidth needed to perform an assisted acceleration service, as described herein.

The video streaming management component 480 subscribes to multicast network communications for one or more video streaming profiles for a first video content (block 715). For example, as shown in the graph 600, the video streaming management component 45 could subscribe to the 4 and 8 Mb per second ABR profiles 640 for the video service 2. The video streaming management component 45 and selectively requests a plurality of data packets for at least one ABR streaming profile, using a portion of the reserved network bandwidth (block 720). For instance, the video streaming management component 45 could iteratively request data packets from increasingly higher bit rate ABR profiles, until one of the ABR profiles to which the network gateway device is already subscribed is reached. As an example, the graph 630 shown in FIG. 6 illustrates that the video streaming management component 480 requested data packets from the 0.2 Mb per second ABR profile, then the 0.5 Mb per second ABR profile, followed by the 1 and then 2 Mb per second ABR profiles. Doing so provides an assisted acceleration mechanic that assists client devices in reaching the ABR profiles already cached on the network gateway device.

Figure 8:
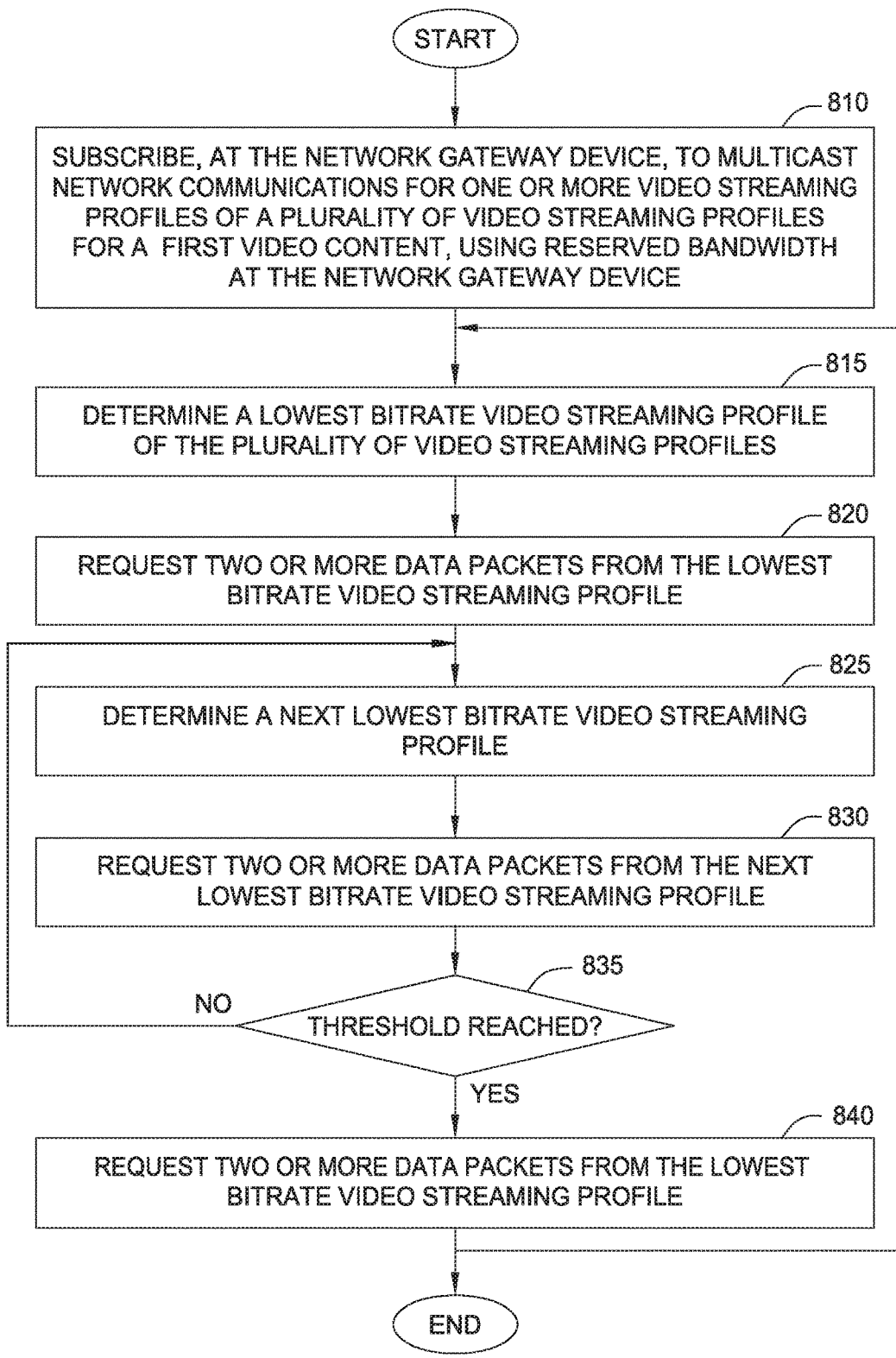
FIG. 8 is a flow diagram is a flow diagram illustrating a method of providing assisted acceleration for a video streaming client until a threshold bit rate is reached, according to one embodiment described herein.

FIG. 8 is a flow diagram is a flow diagram illustrating a method of providing assisted acceleration for a video streaming client until a threshold bit rate is reached, according to one embodiment described herein. As shown, the method 800 begins at block 810, where the video streaming management component 480 subscribes to multicast data communications for one or more video streaming profiles for a first video content, using reserved network bandwidth. The video streaming management component 480 determines a lowest bit rate video streaming profile (block 815). For example, in the embodiment shown in FIG. 5A and discussed above, the video streaming management component 480 could determine that the 0.2 Mb per second ABR profile is the lowest bit rate video streaming profile for the first video content. The video streaming management component 480 then requests two or more data packets from the lowest bit rate video streaming profile (block 820). For example, the video streaming management component 45 could subscribe to multicast data communications for the lowest bit rate video streaming profile from an upstream network device.

Generally, the video streaming management component 480 can continue receiving data packets for the lowest bit rate ABR profile for some period of time. Eventually, the video streaming management component 480 determines a next lowest bit rate video streaming profile (block 825). For instance, continuing the aforementioned example, the video streaming management component 45 could determine that the 0.5 Mb per second ABR profile is the next lowest bit rate video streaming profile, relative to the 0.2 Mb per second lowest bit rate video streaming profile. The video streaming management component 480 request to a more data packets from the determined next lowest bit rate video streaming profile (block 830). For instance, the video streaming management component 480 could subscribe to multicast data communications for the determined next lowest bit rate video streaming profile from an upstream network device. In one embodiment, when doing so, the video streaming management component 480 also unsubscribes to the multicast data communications for the lowest bit rate video streaming profile.

At decision block 835, the video streaming management component 480 determines whether a threshold bit rate ABR profile has been reached. In one embodiment, the threshold ABR profile refers to one of the video streaming profiles to which the network device subscribed at block 810. For example, as shown in FIGS. 5A and B and discussed above, the threshold profile refers to the 4 Mb per second video streaming profile. That is, as the video streaming management component 480 is influencing the client devices to switch to one of the already cached ABR profiles using the assisted acceleration techniques described herein, video streaming management component 480 can determine that this goal has been achieved once a sufficient number of data packets for the 2 Mb per second video streaming profile have been cashed at the network gateway device.

If the streaming management component 485 determines that the threshold profile has not yet been reached, the method 800 returns to block 825, where the video streaming management component 480 determines a next lowest bit rate ABR profile. For example, after selecting the 0.5 Mb per second video streaming profile, the video streaming management component 480 could select the 1 Mb per second video streaming profile as the next lowest bit rate profile, relative to the currently selected profile (i.e., the 0.5 Mb per second profile). The video streaming management component 480 then subscribes to multicast data communications for the selected profile, and subsequently determines again whether the threshold video profile has been reached. Continuing the example, the video streaming management component 480 could repeat this process until sufficient data packets for the 2 Mb per second profile have been received, at which point client devices may determine that additional network bandwidth appears to be available and thus may request data packets from the 4 Mb per second profile. Doing so enables the client device to make an optimal selection of an ABR profile, was the network gateway device is already subscribed to multicast data communications for the 4 Mb per second profile and these data packets have already been cached on the network gateway device, without requiring any specialized logic or knowledge on the client device.

Once the video streaming management component 480 determines that the threshold ABR profile is reached, the video streaming management component 480 determines a next video content item to provide assisted acceleration services for (block 840). For example, the first video content could represent a broadcast television channel, and the video streaming management component 480 could determine another broadcast television channel to provide assisted acceleration services for. An example of this is shown in FIG. 6 and discussed above, where the additional assistance services 620 are provided for each of the services 610 in a rotation. Once the video streaming management component 480 determines the next video content item to provide assistance for, the method 800 returns to block 815, where the video streaming management component 480 determines the lowest bit rate video streaming profile for the selected video content item.

Figure 9:
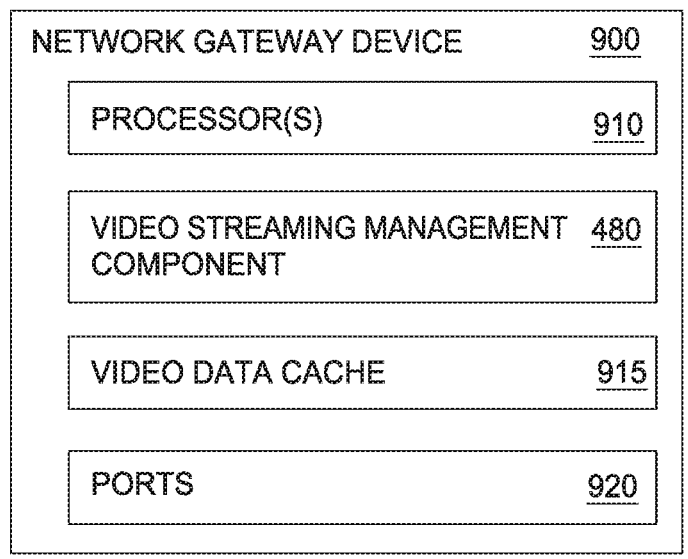
FIG. 9 is a block diagram illustrating a network device configured with a video streaming management component, according to one embodiment described herein.

FIG. 9 is a block diagram illustrating a network device configured with a video streaming management component, according to one embodiment described herein. As shown, the network device 900 includes, without limitation, processors 910, video streaming management component 480, video data cache 915 and communication ports 920. The processor 910 may be any processing element capable of performing the functions described herein. The processor 910 represents a single processor, multiple processors, a processor with multiple cores, and combinations thereof. The video data cache 915 generally stores downloaded data packets for one or more video streaming profiles for a video content item. Logic on the network gateway device 900 may be configured to receive requests for video content from one or more downstream client device (e.g., to CDN 210), and to redirect such requests to be processed by the network gateway device 900 using the video data cache 915. The video data cache 915 may contained with a memory device (not shown), which may be either volatile or non-volatile memory and may include RAM, flash, cache, disk drives, and the like. The network device may also include a control plane for configuring and managing the forwarding logic.

Generally, the video streaming management component 480 is configured to provide assisted acceleration services for downstream video streaming clients. In one embodiment, the video streaming management component 480 reserves a determined amount of bandwidth at a network gateway device, on a link between the network gateway device and an upstream network device. The video streaming management component 480 can additionally subscribing, at the network gateway device, to multicast network communications for one or more video streaming profiles of a plurality of video streaming profiles for a first video content. Each of the plurality of video streaming profiles corresponds to a respective encoding of the first video content. Data packets received over the multicast network communications for the one or more video streaming profiles can be stored in the video data cache 915. The video streaming management component 480 can selectively request data packets for at least one of the plurality of video streaming profiles, from at least one upstream network device, using at least a portion of the reserved determined amount of bandwidth. These data packets can also be stored in the video data cache 915 and provided to client devices in order to provide the assisted acceleration services.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method, comprising:
identifying a subscription, at a network gateway device, to multicast network communications for a first video streaming profile, of a plurality of video streaming profiles, for a first video content, wherein each of the plurality of video streaming profiles corresponds to a respective encoding of the first video content;
reserving an amount of bandwidth on a link between the network gateway device and an upstream network device, for use in performing an assisted acceleration operation for a client device that is streaming the first video content from a content distribution network, wherein the amount of bandwidth reserved is determined based on a bit rate of the first video streaming profile and is sufficient to enable transmission from the upstream network device to the network gateway device of a second video streaming profile comprising a bit rate less than the bit rate of the first video streaming profile;
selectively requesting, using the network gateway device, transmission of a plurality of data packets for the second video streaming profile, from the upstream network device to the network gateway device using the link, without requiring a request to be received for the second video streaming profile from the client device; and
transmitting one or more data packets for the first video streaming profile to the client device from the network gateway device.

2. The method of claim 1, wherein selectively requesting transmission of the plurality of data packets for the second video streaming profile further comprises:
determining a lowest bit rate video streaming profile of the plurality of video streaming profiles; and requesting two or more data packets for the lowest bit rate video streaming profile.

3. The method of claim 2, wherein selectively requesting transmission of the plurality of data packets for the second video streaming profile further comprises:
  upon requesting two or more data packets for the lowest bit rate video streaming profile, determining a next lowest bit rate video streaming profile of the plurality of video streaming profiles; and
  requesting two or more data packets for the next lowest bit rate video streaming profile.

4. The method of claim 3, wherein selectively requesting transmission of the plurality of data packets for the second video streaming profile further comprises:
  continuing to request data packets from incrementally higher bit rate video streaming profiles, until a threshold bit rate is reached.

5. The method of claim 3, wherein selectively requesting transmission of the plurality of data packets for the second video streaming profile further comprises:
  continuing to request data packets from incrementally higher bit rate video streaming profiles, until a threshold bit rate is reached;
  determining a plurality of video streaming profiles for a second video content, the second video content distinct from the first video content;
  determining a second lowest bit rate video streaming profile of the second plurality of video streaming profiles; and
  requesting two or more data packets for the second lowest bit rate video streaming profile for the second video content.

6. The method of claim 5, wherein the threshold bit rate comprises a bit rate of one of the one or more video streaming profiles.

7. The method of claim 1, further comprising:
  receiving the plurality of data packets from the upstream network device; and
  caching the plurality of data packets, such that the plurality of data packets can be provided to one or more downstream network devices upon request.

8. The method of claim 7, wherein transmitting the one or more data packets for the first video streaming profile to the client device from the network gateway device further comprises:
  upon receiving a request from the client device for data for a first one of the at least one video streaming profile, retrieving one or more of the cached plurality of data packets; and
  transmitting the one or more retrieved data packets to the client device.

9. The method of claim 1, wherein the second video streaming profile is distinct from the first video streaming profile.

10. The method of claim 1, wherein each encoding of the first video content is at a respective bit rate.

11. The method of claim 10, wherein the first video streaming profile comprises the highest bit rate of the plurality of video streaming profiles for the first video content.

12. A network device, comprising:
  one or more computer processors; and
  logic that, when executed by operation of the one or more computer processors, performs an operation comprising:
    identifying a subscription, at a network gateway device, to multicast network communications for a first video streaming profile, of a plurality of video streaming profiles, for a first video content, wherein each of the plurality of video streaming profiles corresponds to a respective encoding of the first video content;
    reserving an amount of bandwidth on a link between the network gateway device and an upstream network device, for use in performing an assisted acceleration operation for a client device that is streaming the first video content from a content distribution network, wherein the amount of bandwidth reserved is determined based on a bit rate of the first video streaming profile and is sufficient to enable transmission from the upstream network device to the network gateway device of a second video streaming profile comprising a bit rate less than the bit rate of the first video streaming profile;
    selectively requesting, using the network gateway device, transmission of a plurality of data packets for the second video streaming profile, from the upstream network device to the network gateway device using the link, without requiring a request to be received for the second video streaming profile from the client device; and
    transmitting one or more data packets for the first video streaming profile to the client device from the network gateway device.

13. The network device of claim 12, wherein selectively requesting transmission of the plurality of data packets for the second video streaming profile further comprises:
  determining a lowest bit rate video streaming profile of the plurality of video streaming profiles; and
  requesting two or more data packets for the lowest bit rate video streaming profile.

14. The network device of claim 13, wherein selectively requesting transmission of the plurality of data packets for the second video streaming profile further comprises:
  upon requesting two or more data packets for the lowest bit rate video streaming profile, determining a next lowest bit rate video streaming profile of the plurality of video streaming profiles; and
  requesting two or more data packets for the next lowest bit rate video streaming profile.

15. The network device of claim 14, wherein selectively requesting transmission of the plurality of data packets for the second video streaming profile further comprises:
  continuing to request data packets from incrementally higher bit rate video streaming profiles, until a threshold bit rate is reached.

16. The network device of claim 14, wherein selectively requesting transmission of the plurality of data packets for the second video streaming profile further comprises:
  continuing to request data packets from incrementally higher bit rate video streaming profiles, until a threshold bit rate is reached;
  determining a plurality of video streaming profiles for a second video content, the second video content distinct from the first video content;
  determining a second lowest bit rate video streaming profile of the second plurality of video streaming profiles; and
  requesting two or more data packets for the second lowest bit rate video streaming profile for the second video content.

17. The network device of claim 16, wherein the threshold bit rate comprises a bit rate of one of the one or more video streaming profiles.

18. The network device of claim 12, the operation further comprising:
  receiving the plurality of data packets from the upstream network device; and
  caching the plurality of data packets, such that the plurality of data packets can be provided to one or more downstream network devices upon request wherein transmitting the one or more data packets for the first video streaming profile to the client device from the network gateway device further comprises:
    upon receiving a request from the client device for data for a first one of the at least one video streaming profile, retrieving one or more of the cached plurality of data packets; and
    transmitting the one or more retrieved data packets to the client device.

19. The network device of claim 12, wherein each encoding of the first video content is at a respective bit rate, and wherein the first video streaming profile comprises a highest bit rate of the plurality of video streaming profiles for the first video content.

20. A method, comprising:
  identifying a subscription, at a network gateway device, to multicast network communications for a first video streaming profile, of a plurality of video streaming profiles, for a first video content, wherein each of the plurality of video streaming profiles corresponds to a respective encoding of the first video content;
  reserving an amount of bandwidth on a link between the network gateway device and an upstream network device, for use in performing an assisted acceleration operation for a client device that is streaming the first video content from a content distribution network, wherein the amount of bandwidth reserved is determined based on a bit rate of the first video streaming profile and is sufficient to enable transmission from the upstream network device to the network gateway device of a second video streaming profile comprising a bit rate less than the bit rate of the first video streaming profile
  determining a lowest bit rate video streaming profile, of the plurality of video streaming profiles for the first video content;
  while the client device is subscribed to receive data from the first video streaming profile, retrieving a plurality of data packets for the determined lowest bit rate video streaming profile, using the network gateway device, from the upstream network device to the network gateway device using the link, without requiring a request to be received for the lowest bit rate video streaming profile from the client device;
  iteratively retrieving data packets from a next lowest bit rate video streaming profiles for the first video content, until one or more criteria are satisfied;
  storing received data packets within a cache on the network gateway device; and
  transmitting data packets from the cache to the client device.

* * * * *